(12) United States Patent
Lindgren

(10) Patent No.: US 9,924,729 B2
(45) Date of Patent: Mar. 27, 2018

(54) METHOD AND DEVICE FOR PREPARING CHEESE BY OHMIC HEAT TREATMENT

(71) Applicant: Daniel Lindgren, Reedsville, WI (US)

(72) Inventor: Daniel Lindgren, Reedsville, WI (US)

( * ) Notice: Subject to any disclaimer, the term of this patent is extended or adjusted under 35 U.S.C. 154(b) by 44 days.

(21) Appl. No.: 14/691,951

(22) Filed: Apr. 21, 2015

(65) Prior Publication Data

US 2015/0296824 A1    Oct. 22, 2015

Related U.S. Application Data

(60) Provisional application No. 61/982,213, filed on Apr. 21, 2014.

(51) Int. Cl.
*A01J 11/00* (2006.01)
*A23C 19/068* (2006.01)
*A01J 25/00* (2006.01)
*A23C 19/06* (2006.01)

(52) U.S. Cl.
CPC ......... *A23C 19/0684* (2013.01); *A01J 25/008* (2013.01); *A23C 19/06* (2013.01)

(58) Field of Classification Search
CPC ..... A23C 19/0684; A23C 19/06; A01J 25/008
USPC ......... 99/483, 476, 495, 452, 485–487, 516, 99/536, 534, 468, 471, 473; 426/233, 426/466, 450, 445, 615
See application file for complete search history.

(56) References Cited

U.S. PATENT DOCUMENTS

| | | | | |
|---|---|---|---|---|
| 5,216,945 A | * | 6/1993 | Heyland | A23P 30/34 425/131.1 |
| 6,090,423 A | * | 7/2000 | Wetzel | A23L 5/15 34/499 |
| 2009/0047403 A1 | * | 2/2009 | Lyon | A23N 1/02 426/483 |
| 2009/0158940 A1 | * | 6/2009 | Archer | A47J 39/006 99/403 |
| 2011/0076373 A1 | * | 3/2011 | Cretors | A23L 7/183 426/450 |

* cited by examiner

*Primary Examiner* — Phuong Nguyen
(74) *Attorney, Agent, or Firm* — Mandy T. Garrels; Ceres Patent & Technology, LLC

(57) ABSTRACT

An invention directed to a process and device for electrically heating and preparing pasta filata type cheeses. The ohmic heating process of this invention is introduced after separation of initial curd from whey, as heated stretching is initiated to create nascent pasta filata cheese fibers. An apparatus is devised to receive the newly formed curd mass and to provide contact of the mass with an electric coupler that channels electric current through the conductive cheese mass as it is concurrently stretched. The features of this device include an electrically charged element, a grounding element and a texturizing tool.

3 Claims, 6 Drawing Sheets

METHOD AND DEVICE FOR PREPARING CHEESE BY OHMIC HEAT TREATMENT

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

CROSS REFERENCE

This is an original provisional patent application.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark office, patent file or records, but otherwise reserves all copyright rights whatsoever.

BACKGROUND OF THE INVENTION

Field of the Invention

The present matter relates to a method of preparing and cooking cheese, specifically natural cheese of the pasta filata type, by ohmic heat treatment.

Background

Natural cheese, particularly of the pasta filata family (including but not limited to mozzarella, provolone, or blends thereof) are typically prepared by cooking and processing under high temperatures. Traditionally, the process involves introduction of enzyme additives to warm milk content, activating the catalyzing affect of enzymes and facilitating protein bonds. As nascent fibers form, semi-solid curds can be separated from the liquid whey. It is usually at this point that the early stage of processing is initiated wherein temperatures are increased and initial churning causes nascent pasta filata fibers to bond, stretch and form.

The conventional manufacturing method for heating and forming the nascent cheese mass at this stage is by way of submerging the cheese curds in a hot water bath and initiating initial churning and stretching by auger. The hot water bath provides heat to the immersed body of curd. The heat from the hot water bath penetrates the curd while it is initially churned and stretched to form the nascent cheese mass. Passive heating by this method results in a warmer external cross sectional layer and a cooler internal layer of the nascent cheese mass once it is formed. To reach the proper internal temperature during this cooking process, a higher than desired water temperature and longer than desired immersion time is required. This results in uneven cross-sectional heating of the nascent cheese mass. The higher temperature and long exposure time results in a greater amount of denatured enzymes and bacteria at the outer layer as well as butterfat loss.

At a smaller scale, particularly for artisanal hand crafting, unseasoned hot water is used to churn and stretch the curd. Salt may be separately added prior or subsequent to nascent cheese formation. Large scale manufacturing is tailored to mimic this traditional process wherein curd is churned and stretched in hot liquid bath. Seasoning typically occurs while the nascent cheese mass is being formed by exposure to brining liquid. Exposure time to brine solution becomes a limiting factor given extensive reliance on brine to heat and cool the cheese. The range of achievable flavor profile is more limited at the large scale manufacturing level since there is little opportunity to control seasoning. Other disadvantages of the brine immersion process include substantial loss of fat content and flavor. Other drawbacks include large amounts of pollution and toxins disposed from volumes of used brine liquid. Energy is required to continually heat large volume of brine. The amount of space required to accommodate the volume of brine involved for large scale manufacturing takes up substantial floor space.

Alternative manufacturing methods have been devised to minimize reliance on liquid brine for heating and cooling. More popular alternatives rely on steam to heat the nascent cheese mass. See WO 1999053749. Although speed is improved as a higher temperature is achievable by steam, the quality of the cheese is compromised by overheating. Other less conventional methods of heating without liquid brine have included ohmic (electric) heating. The common application have been primarily for pasteurization or sterilization purposes wherein food is exposed to high heat levels towards the end of a process. However, given the high temperature requirement within industries where ohmic heating is applied, the types of food cooked have been primarily egg products where texture and flavor is least compromised by the high temperature. As it has been applied to cheese production, this method has been used only to sterilize soft unripened cheese near the end of the cheese making process. See US 20110045133.

There remains a need for a method and device to heat and produce nascent pasta filata cheese in an efficient and improved manner for large scale manufacture. The goal of such an invention would be to improve on flavor, lower energy expenditure, eliminate use of liquid brine, and reduce spatial foot print of manufacturing equipment. No such solution exists to date that addresses each and every of these concerns effectively.

SUMMARY OF THE INVENTION

An invention directed to a process and device for preparing pasta filata type cheeses by electrical heating method. The goal of the invention is to eliminate use of brine, establish an even temperature throughout the cheese cross section, improve upon speed of heating the cheese, minimize spatial footprint, increase speed of production, improve on flavor, moisture and fat content retention, and provide flexible range of options for salting and seasoning the cheese mass. Specifically, this invention affectively eliminates reliance of hot brine liquid to heat cheese matter.

This invention focuses on the early phase of cheese mass formation from the processing of separated cheese curd. An apparatus is devised to receive a curd mass and to provide heat to said curd mass by way of direct electrical contact. The curd mass being electro-conductive in nature is heated evenly and instantly throughout to a desired temperature. Temperature may be adjusted by level of electric current output, the concentration of conductive ingredient within the cheese mass or by duration of exposure. The preferred cooking temperature is between 120 F-165 F, which is standard for the preparation of pasta filata cheese. The level of electric current (thus heat) achievable by this device would depend on the power capacity of the electric element. A three phase power electrical element may achieve the desired temperature range of this invention. Applying higher power or wattage may improve speed of heating. Arcing of the power supply defines the limitation of current output levels.

The device of this invention comprises the following: an electrically charged element (either an exposed coupler or a charged electric plate), a grounding element, and a texturizing tool. The texturizing tool may comprise an auger for churning the nascent curd to achieve a nascent cheese mass. It may alternatively comprise a compression system for texturizing (pulling and stretching) the nascent proteins. The compression system may comprise a counter-rotating dual compression belt system similar to the technology disclosed and claimed in U.S. patent application Ser. Nos. 13/838,020 and 13/426,397, incorporated by reference herein. The final conceived method of producing a nascent pasta filata cheese mass would be based upon the choice embodiment of this device. If an auger tool is used to produce texture, an electric current may be run through the auger to which the curd mass would be churned, cooked and stretched concurrently. If a counter-rotating dual compression belt system is used wherein the belt device provides the source of electricity, the cheese mass may be partially formed before entering the compressed chamber for further heating and texturizing. Combinations of these elements may optionally be combined to create hybrid systems of electric heating and texturizing. The device may be embodied as interconnectable individual units. The device may replace any portion of existing manufacturing equipment where heating of the cheese mass is needed.

The electric current is generated and managed accordingly by industry standards, typically three phase power in series or parallel form. The heating elements should take into consideration standard governmental regulation for cooking, cleaning and disposal of material related to this process. Existing machines for cooking and preparing cheese products comprise many spare parts and hidden surfaces that require complete disassembly for cleaning. This becomes inefficient and burdensome. The apparatus of this invention, by its open and exposed surfaces enables direct spray cleaning without need for removal of spare parts or complicated disassembly. The electrical element may be embodied in the form of a free floating electrical probe, electro-conductive flat plates or an auger.

The material composition of the electric element is important to preserve food safety and quality. It is preferable that the electric element comprise noncorrosive material that do not flake nor precipitate. These may include material such as titanium, platinized electrode or carbon electrodes. A buffer plate may be attached over the electrical surface to facilitate conduction but to avoid direct contact with the food product. The auger or probe may be removable in whole for indirect spray or immersion cleaning purposes.

This invention further introduces a new method of preparing the nascent cheese mass by way of ohmic heating, eliminating use of liquid brine. By this method, a nascent curd mass is introduced to an electrical element and heated to a desired temperature. Once the curd mass reaches the desired temperature level, ranging between 120 F to 165 F, protein bonds begin to denature and fiberous texture begin to form with the aid of a texturizing tool. Typically, the texturizing tool may be an auger or similar mixing tool that churns and stretches the hot curd mass to form a nascent cheese mass for subsequent stages of processing. According to current methods, separated curd is immersed in hot brine liquid at a high temperature near 160 F, churned and stretched to form a nascent cheese mass. Once the nascent cheese mass is formed, it enters later stages of processing (i.e. stretching, molding, cooling, cutting, aging etc.) for the final packagable product. The method of this invention is focused on the earlier phase of cheese formation, particularly formation of a nascent cheese mass from separated cheese curd. Once the curd is formed and separated from the whey, the curd enters a chamber where it is heated by electro-conduction. At this stage, as it reaches the ideal temperature, it is churned and stretched by the particular choice texturizing tool. Seasoning may take place any time during the cheese making process. Because the cheese mass is electrically heated to the same temperature throughout its cross-sectional body, high temperature exposure for passive heating is no longer required. This results in greater retention of fat, moisture, flavor and live cultures, quicker processing speed, elimination of brine solution and a much smaller spatial footprint.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

Reference will now be made in detail to exemplary aspects of the present invention which are illustrated in the accompanying drawings. Detailed descriptions of the preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

It is to be understood that any exact measurements/dimensions or particular construction material indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1:
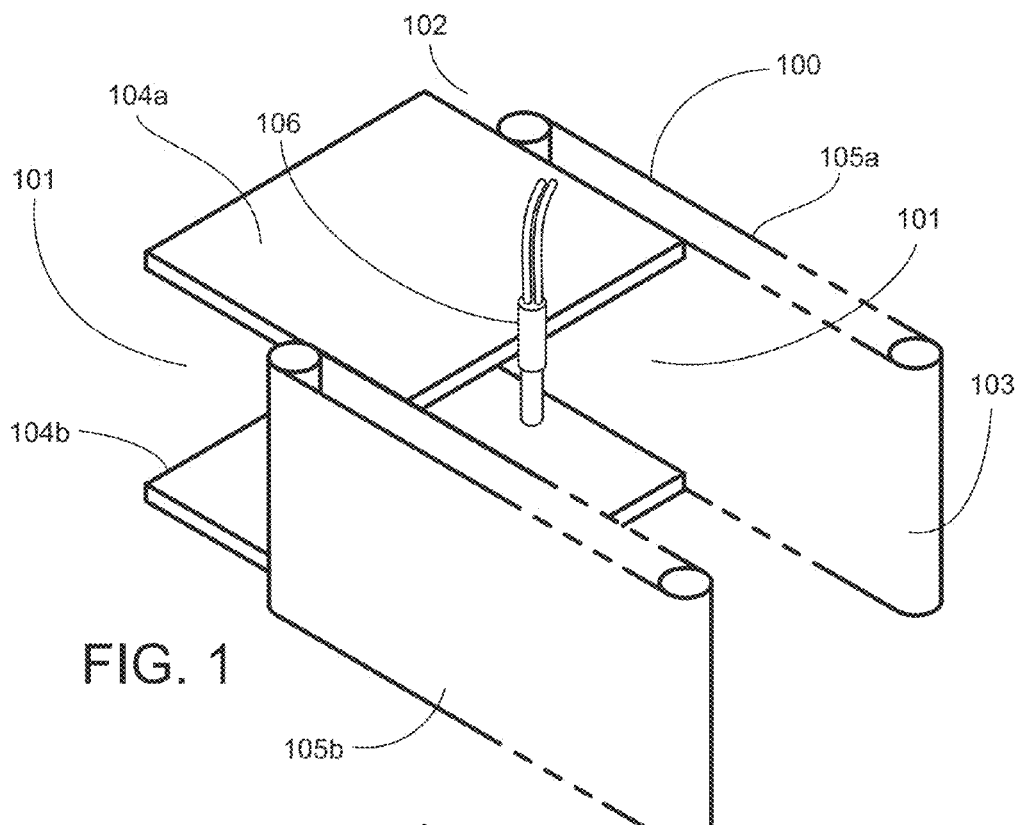
FIG. 1 is an exemplary embodiment of the invention as described herein.

FIG. 1 provides an exemplary embodiment of the device comprising a counter-rotating dual compression belt 100 similar to that disclosed in U.S. patent application Ser. No. 13/838,020 and Ser. No. 13/426,397, referenced and incorporated in their entirety herein, wherein a hollow length of compressed space or channel 101 is established with unidirectional movement within. The device having a first end 102 to receive the curd or cheese mass and a second end 103 for releasing the processed product. In the case of FIG. 1, the belts having an electro-conductive portion 104 a,b located near the first receiving end 102 of the channel where the cheese matter is first captured and directed inward. The electro-conductive portion may comprise two electrode plates 104 a,b perpendicularly positioned between the two belts 105 a,b, parallel to each other. The nascent cheese mass, or semi-processed nascent curd, would enter the area of the first receiving end 102, be captured by the counter-rotating belt device 100, pass through the length of electro-conductive plates 104 a,b, heated to a desired temperature, and be pulled to stretch through said channel 101 of said counter-rotating dual compression belt device 100. The electro-conductive plates 104 a,b may be placed at more than one location along the length of the channel 101 such that a variety of temperatures may be set along the channel path. There may be instances where a higher temperature is required at the receiving end for purposes of cooking the cheese and maintained at a lower temperature downstream for different processing requirements. In other instances, the temperature may need to be increased towards the end of the process for purposes such as sterilization. There are occasions where the requisite inner temperature of the cheese must be managed at different levels throughout the process between the beginning and end. The ability to stage individual units of electro-conductive plates 104 a,b along the length of a stretching and processing channel 101 allows the greatest control of such conditions.

A thermocouple 106 may be introduced to the device, protruding into the interior of the channel 101 or hopper where the cheese passes through. The thermocouple would transmit data regarding the temperature of the cheese mass to which the user may remotely adjust current levels to control heat. The thermocoupler 106 may be located or staged anywhere along the length of the channel 101, not necessarily on the electro-conductive element 104 a,b itself. However, if the intention is to control electrical current output, then it is preferable the thermocouple 106 be placed most proximate to the electro-conductive element 104 a,b for a true reading of the environment.

Figure 2:
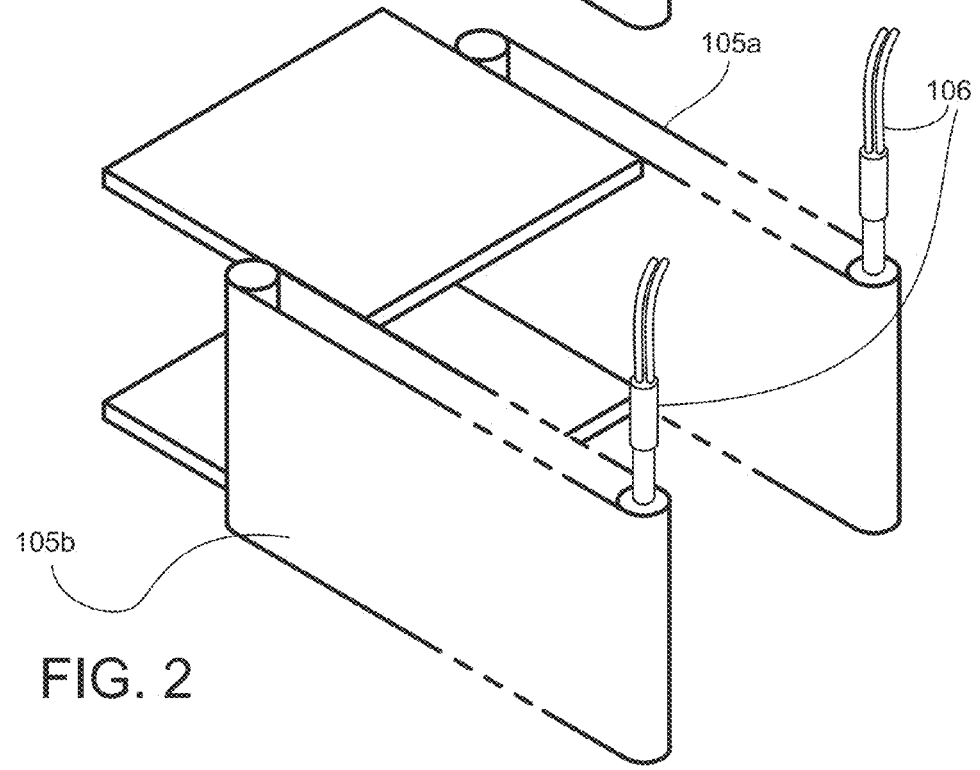
FIG. 2 is an exemplary embodiment of the invention as described herein.

FIG. 2 provides an alternative embodiment of the invention wherein the electrical output is provided through the dual compression belt 105 a,b. The belt themselves being electro-conductive in nature, immediately heats the curd or cheese mass upon contact. The belt material must be flexible and nonbrittle in nature and must further be noncorrosive or nonprecipative to avoid flaking or debris. According the embodiment of FIG. 2, the dual compression belts 105 a,b defining the structure of the device would define as well the single electro-conductive unit. Therefore, if staging of plural temperature control is desired along a particular path of processing, a plurality of this defined unit would be interconnected to achieve an affect similar to that described above for FIG. 1. In the case of FIG. 2, a plurality of shorter distanced counter-rotating dual compression belt units would be interconnected along a processing chain. Contrast this structure with FIG. 1, wherein a series of electro-conductive plates 104 a,b are staged along the length of a single channel 101 of a counter-rotating dual compression belt device 100.

Figure 3:
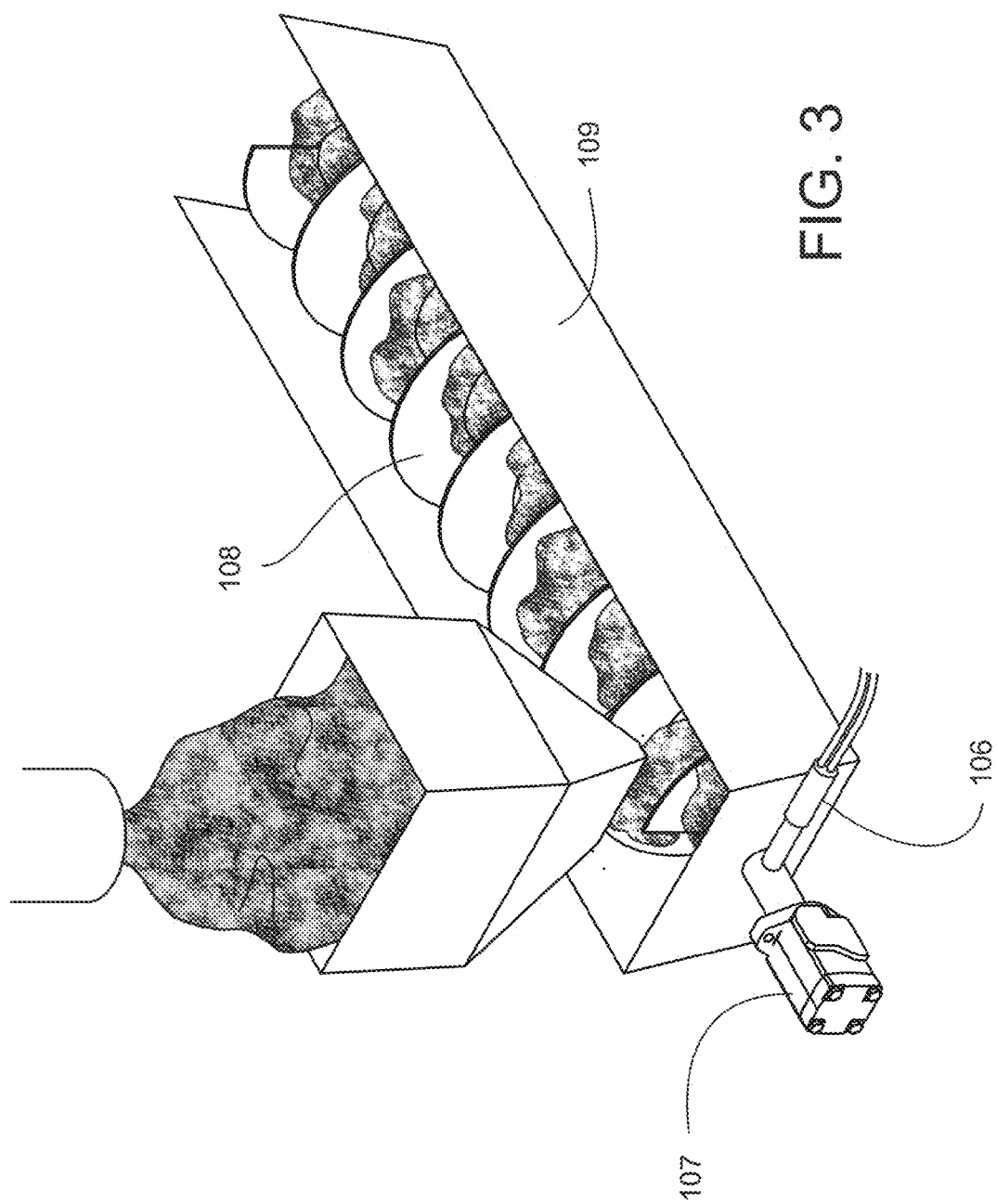
FIG. 3 is an exemplary embodiment of the invention as described herein.
Figure 4:
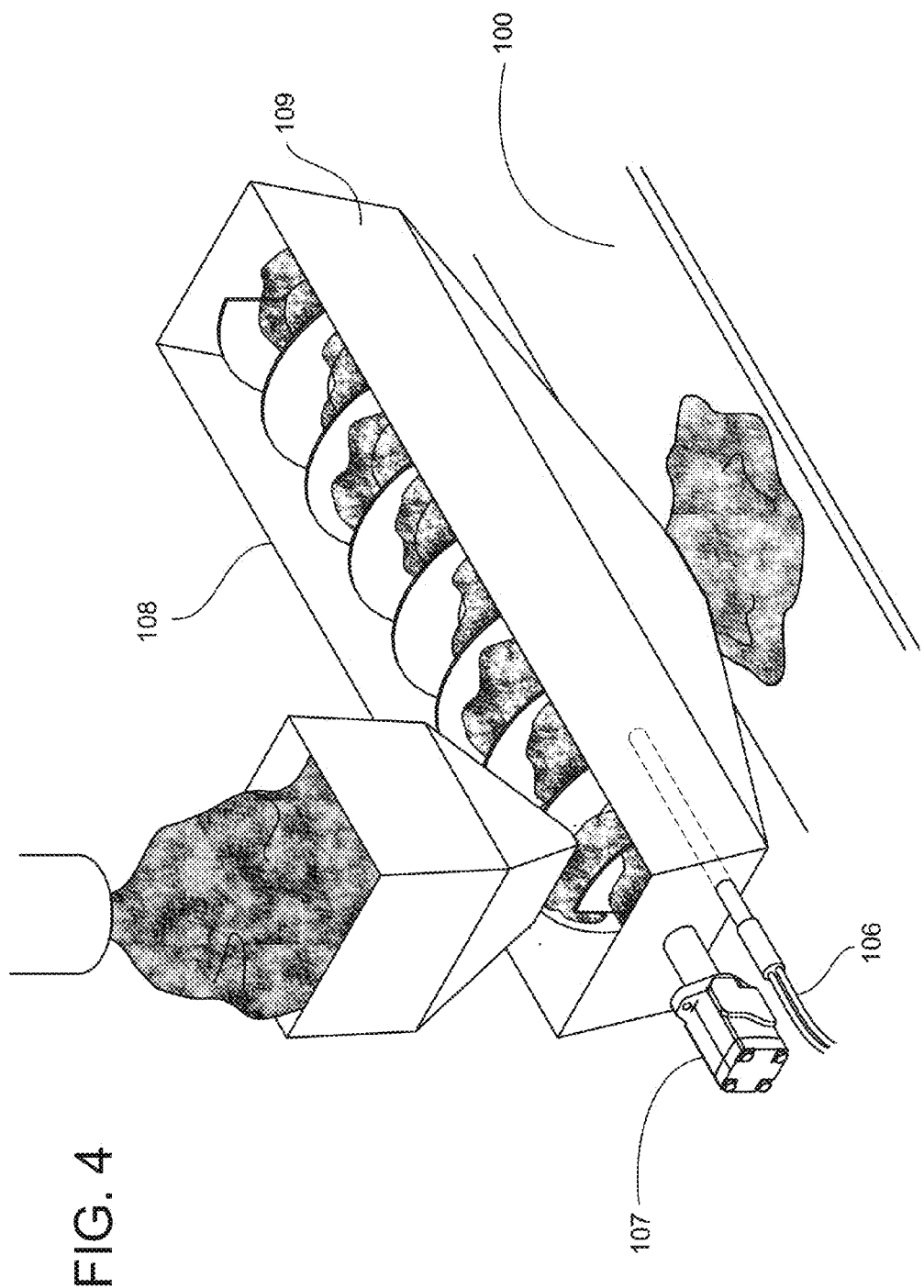
FIG. 4 is an exemplary embodiment of the invention as described herein.

FIG. 3 provides yet a third embodiment of the invention, wherein electrical output 107 is provided through the auger 108. Said auger 108 may be placed within a separate chamber or hopper 109, located externally away from the counter-rotating compression belt device. See FIG. 4. This may be desirable if the curd is meant to be cooked and processed into a nascent cheese mass in a single stage using an auger. Both auger 108 and compression channel texturizing tools 100 may be used in tandem wherein the cheese is heated by the auger 109 and passed onto a conductive channel 101 for further heating and processing.

Figure 5:
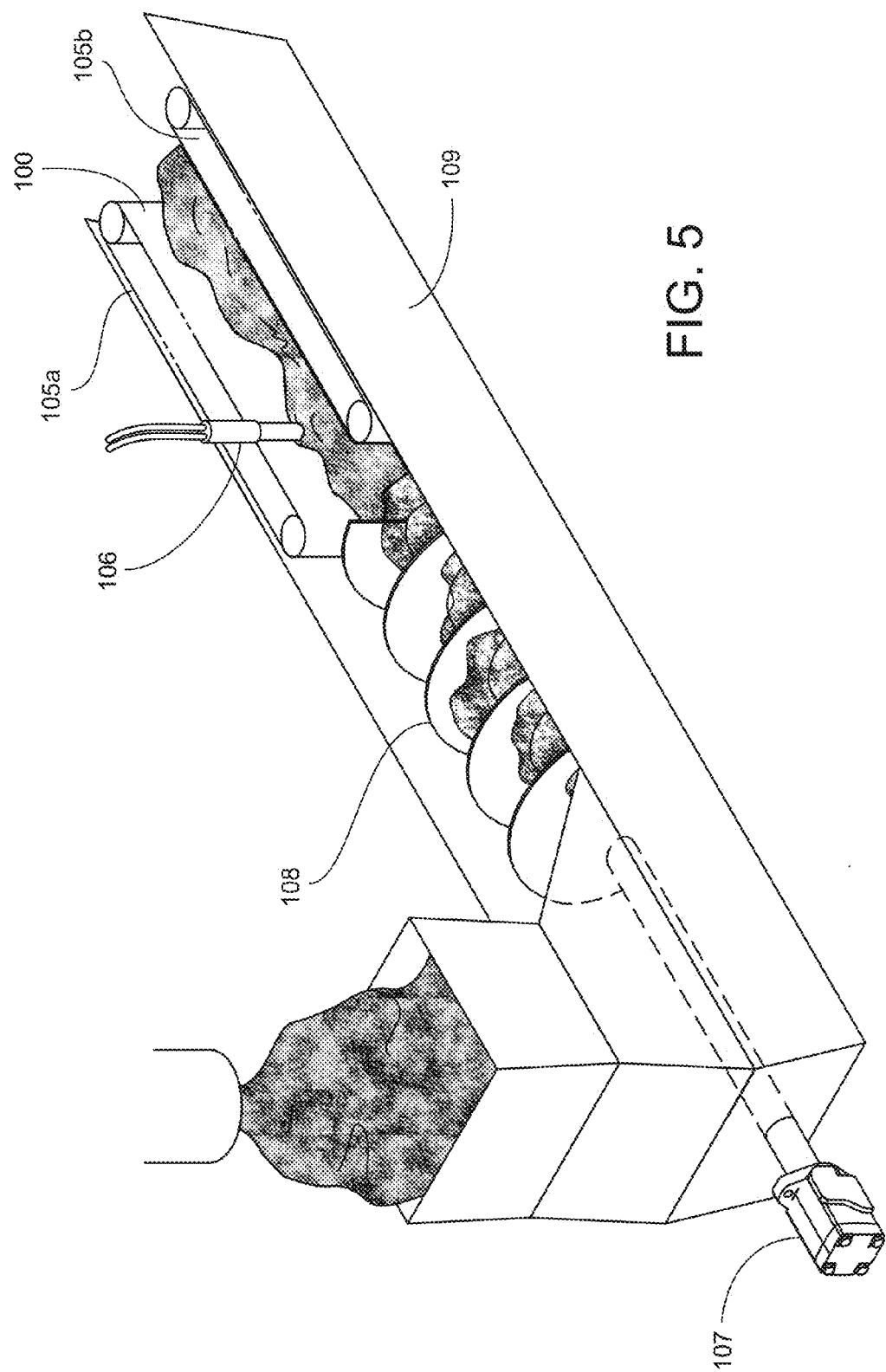
FIG. 5 is an exemplary embodiment of the invention as described herein.

Yet, another embodiment of the electro-conductive auger element of FIG. 3 contemplates placement of the auger 108 within the first receiving end of the hollow channel such that the curd mass is introduced directly into the channel for concurrent heating, churning and stretching. This embodiment is illustrated in FIG. 5, which may be contrasted from the embodiment of FIG. 4, discussed above. A combination of auger, conductive plate or electric probe may be utilized and staged along the length of the processing channel for a variety of stretching and temperature control options.

Figure 6:
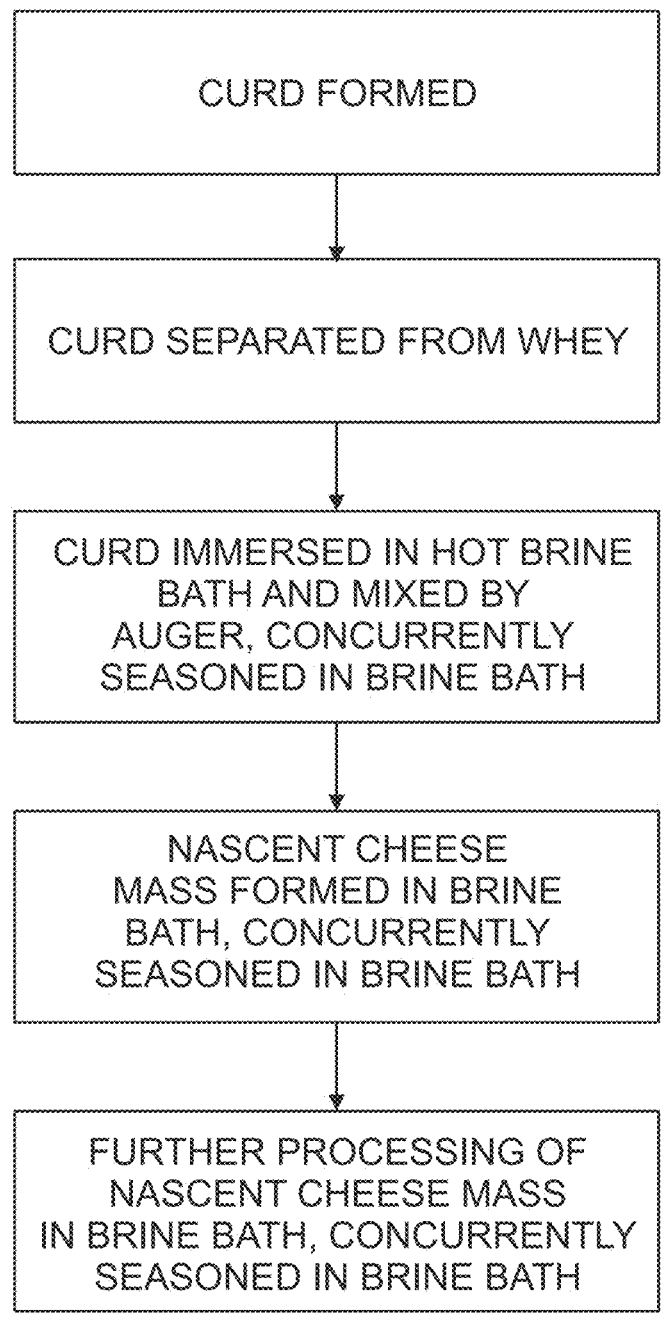
FIG. 6 is an exemplary embodiment of the existing art as described herein.
Figure 7:
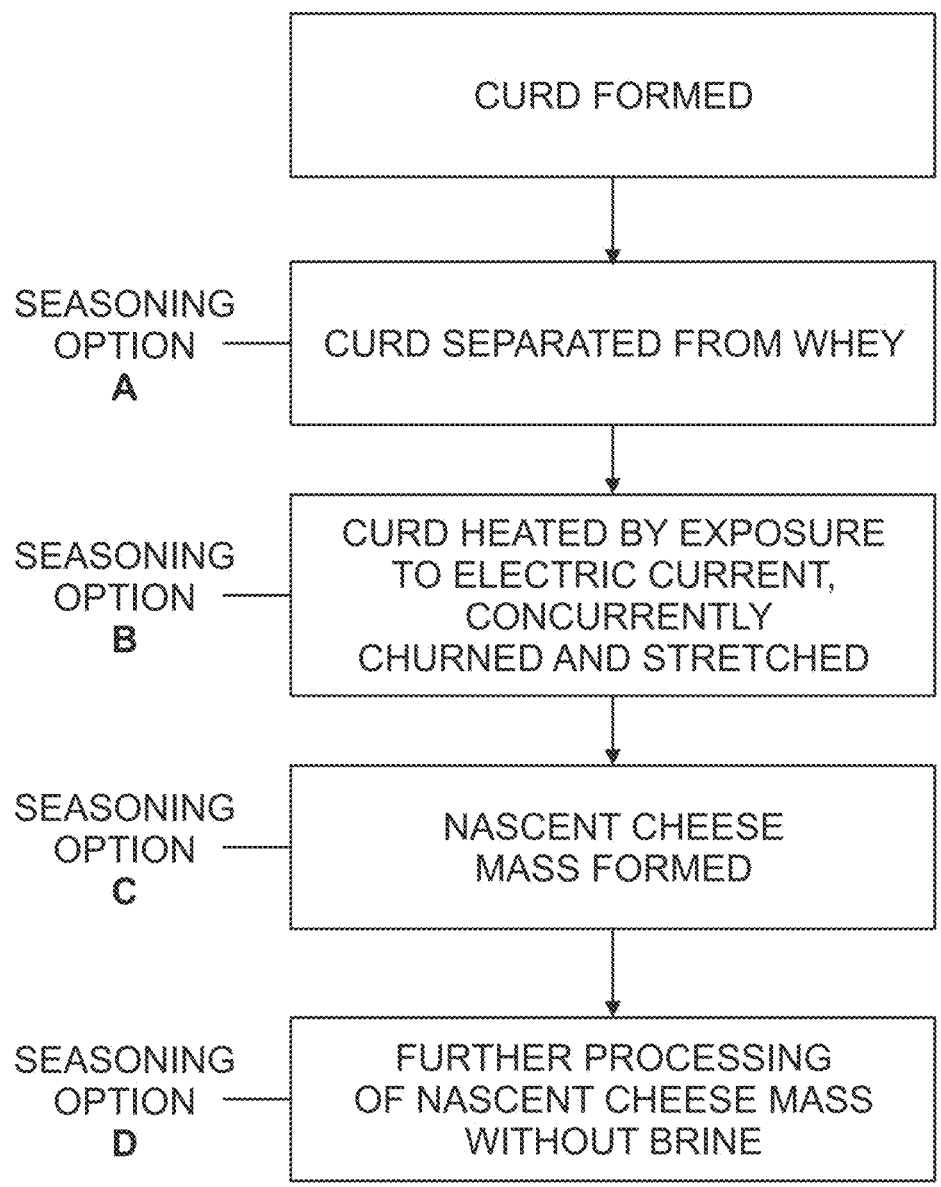
FIG. 7 is an exemplary embodiment of the invention as described herein.

An important improvement by this aspect of the invention is the elimination of liquid brine. Seasoning may occur at any stage of the process by this method of invention. FIG. 6 illustrates the process of the current art of making nascent cheese mass of the pasta filata family utilizing liquid brine solution. FIG. 7 provides a general illustration of this new method for large scale manufacturing of pasta filata cheese where seasoning becomes freely optional and flexible.

According to FIG. 6, new curd is formed by combination of traditional additives to milk product. The curd is separated from the whey and transferred to hot water where it is passively heated to temperature while being churned to form a nascent cheese mass. The curd and transformed mass is further exposed to high salinity brine solution for extensive time and therefore, is being seasoned throughout the process. Once the nascent cheese mass is formed, it is further transferred to the next stages of processing where the cheese mass continues to be immersed in liquid brine while it is stretched, molded and cooled. The cheese mass is continually seasoned and salted throughout this extensive long process of production, comprising up to twelve hours or longer of salt exposure.

In contrast, the method of this invention, generally disclosed in FIG. 7, eliminates use of liquid brine for heating purposes. Once the curd is formed and separated from the whey, it enters a container where it is exposed to an electrical current and heated immediately and evenly to temperature. The heated curd is either contemporaneously or subsequently texturized (churned and stretched) by an auger or an equally effective tool to form protein fibers, transforming the curd kernels to a larger cohesive nascent pasta filata cheese mass. The pasta filata cheese mass is then forwarded for further processing that need not rely on liquid brine to achieve a desired shape, texture and set temperature. See U.S. patent application Ser. Nos. 13/838,020 and 13/426,397. Since the entire process occurs independently of brining liquid, salting and seasoning may occur at any stage (See FIG. 7, Seasoning options A, B, C and D) throughout the extensive cheese making process. Seasoning may occur during single or multiple stages along the process, involving the same or different types of ingredients introduced at the desired time. Salt and flavor may be finely controlled and developed by this method of cheese making where liquid brine is partly or completely eliminated.

Having fully described at least one embodiment of the present invention, other equivalent or alternative methods according to the present invention will be apparent to those skilled in the art. The invention has been described by way of summary, detailed description and illustration. The specific embodiments disclosed in the above drawings are not intended to be limiting. Implementations of the present invention with various different configurations are contemplated as within the scope of the present invention. The invention is thus to cover all modifications, equivalents, and alternatives falling within the spirit and scope of the following claims.

I claim the following:

1. A device for preparing pasta filata cheese by ohmic heating comprising
    a chamber for receiving, containing and heating nascent pasta filata cheese mass,
    said chamber having a first open end for receiving said nascent pasta filata cheese mass and a second open end for releasing said pasta filata cheese mass,
    one or more grounded electro-conductive heating element positionable within or proximate to said chamber,
    each said grounded electro-conductive heating element of said one or more grounded electro-conductive heating element comprising any of each following electro-conductive plate, screw auger, probe, or combinations thereof,
    wherein the device further comprising a counter rotating dual compression belt system for forming pasta filata cheese from heated past filata curd,
    said counter rotating dual compression belt system comprising a first and second circular belt strap, each said circular belt strap having a flat surface,
    said flat surface of said first circular belt strap oppositely facing said flat surface of said second circular belt strap,
    said first and second circular belt strap each rotatable in counter-rotational direction of each other wherein heated pasta filata cheese curd is receivable, pullable and stretchable therethrough in compressed manner,
    each said grounded electro-conductive heating element of said one or more grounded electro-conductive heating element comprising non-corrosive, non-flaking and non-precipitous material,
    each said grounded electro-conducive heating element of said one or more grounded electro-conductive heating element directly contactable with said pasta filata cheese curd for direct conduction of electrical heat throughout said pasta filata cheese curd,
    one or more thermocouple positionable at one or more locations within or proximate to said chamber and directly contactable with said pasta filata cheese curd for remote transmission of cheese curd temperature,
    the electrical output of said one or more grounded electro-conductive heating element is remotely controllable by a remote controller in communication with said one or more thermocouple wherein the temperature of said pasta filata cheese curd is remotely registerable and said one or more electro-conductive heating element is remotely adjustable,
    said pasta filata cheese curd is receivable by said chamber, is heatable by electro-conduction by direct contact with said one or more grounded electro-conductive heating element while being stretched and pulled therethrough and is releasable from said counter-rotating dual compression belt system as a nascent pasta filata cheese mass.

2. Said device for preparing pasta filata cheese by ohmic heating of claim 1 wherein said pasta filata cheese curd is heatable to a temperature between 120 Fahrenheit and 165 Fahrenheit by direct contact of said pasta filata cheese curd with said one or more grounded electro-conductive heating element.

3. Said device for preparing pasta filata cheese by ohmic heating of claim 1 wherein said grounded electro-conductive heating element comprising three-phase power in series or parallel form.

* * * * *